Oct. 14, 1958 E. SATTLER 2,856,443
PROCESS FOR PURIFICATION OF BENZENE
Filed April 25, 1955
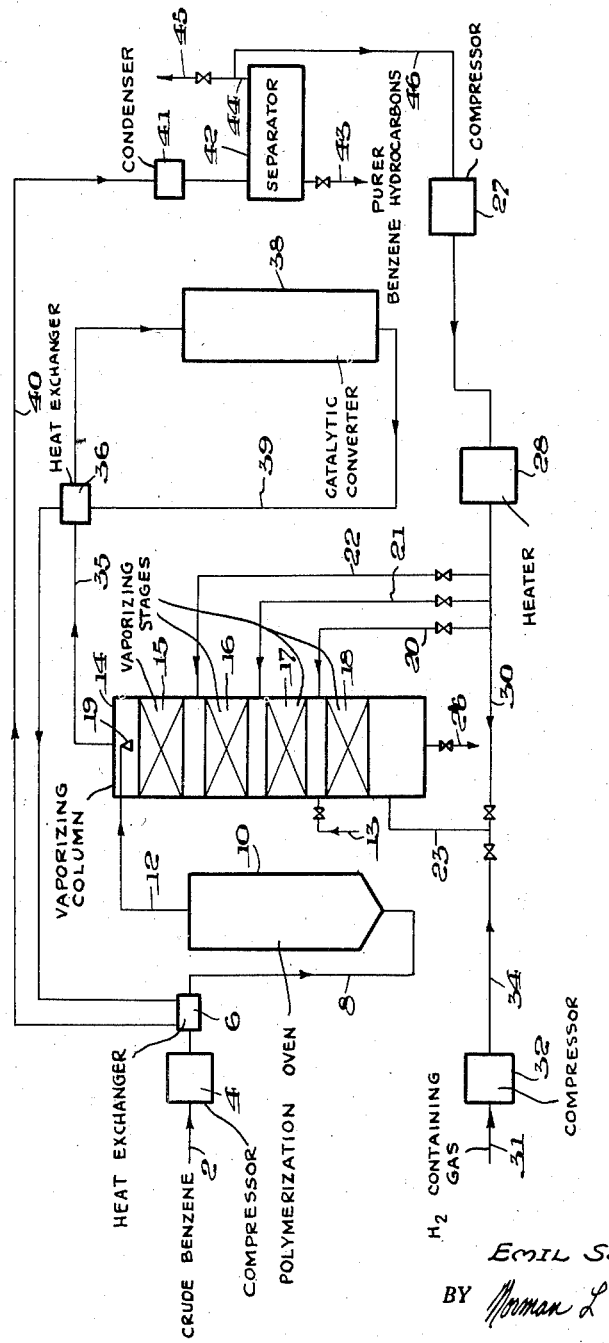
INVENTOR.
EMIL SATTLER.
BY  *Norman L. Wilson Jr*
his ATTORNEY

United States Patent Office 2,856,443
Patented Oct. 14, 1958

2,856,443

PROCESS FOR PURIFICATION OF BENZENE

Emil Sattler, Essen, Germany, assignor, by mesne assignments, to Koppers Company, Inc., Pittsburgh, Pa., a corporation of Delaware Application April 25, 1955, Serial No. 503,745

4 Claims. (Cl. 260—674)

The present invention relates to a process for purification of crude benzene which is known as "pressure refining." The pressure refining of crude benzene consists essentially in subjecting the benzene vapors at increased pressure and increased temperature to a catalytic treatment in the presence of hydrogen or a hydrogen-containing gas. By this treatment the impurities present in the crude benzene are converted into compounds which can be separated from the unconverted benzene hydrocarbons.

In this process the manner in which the crude benzene is converted from the liquid to the vaporous state before the actual catalytic treatment with hydrogen is of essential significance. A vaporization of the crude benzene in an indirect manner, for example, on heated walls of pipes or boilers, leads to difficulties since deposits can form on the walls which deposition leads first to a decrease of heat transfer and finally to the fact that the gas or liquid passageway is completely obstructed. It has been suggested to vaporize the liquid benzene under pressure by means of the hydrogen preheated to a definite temperature which is required in the subsequent refining. The heat required for vaporization of the benzene thus comes essentially from the sensible heat of the hydrogen. In practice this is realized by introducing the total amount of hydrogen gas necessary for the refining into the bottom of a vaporizing column and the liquid benzene at the head, and withdrawing the mixture of benzene vapors and hydrogen from the top of the column.

This type of vaporization doubtless overcomes certain difficulties which were previously caused by indirectly added heat. However, it has been found that a completely trouble-free operation cannot be attained in this manner. The basis thereof lies in the following: The polymerizable materials contained in the liquid benzene form the polymer only within a certain temperature range which cannot be exceeded, since otherwise a depolymerization of the previously formed polymer again occurs. The material newly formed in the depolymerization then passes together with the benzene vapors and hydrogen into the catalyst converter and there causes an obstruction and hence an inactivity of the catalyst. If, as suggested, all the hydrogen gas necessary for the refining is flowed at one time into the bottom of the vaporizing column, or the like, there is the danger that at some zones of the column and especially where the liquid product has become leaner in benzene, a depolymerization of the polymer formed in a pretreatment of the liquid benzene occurs, whereby the effect of the preliminary polymerization is entirely or partially overcome.

The object of the invention is to prevent the danger of a depolymerization during the vaporization of the benzene. A further object of the invention is to regulate the partial pressure in the vaporizing column in definite manner along the column.

The present invention solves the above-cited problem by dividing the vaporizing column in several vaporization stages and adding in several partial streams the portion of hydrogen necessary for the refining, which is recycled, after reheating the vaporizing column for the to-be-purified benzene. Each of these partial streams is added to one vaporization zone. Thereby the temperature and the amount of hydrogen added to each stage of the vaporizing column are so measured that the temperature of the liquid material in the vaporization column does not exceed the value bringing about a depolymerization of the polymerized impurities.

When the hydrogen-containing gas is introduced into the vaporizing column in this way, i. e., stepwise, it is possible to regulate the temperature along the column in the desired manner so that no depolymerizations can occur. Furthermore, the partial pressure in the individual stages can be adjusted to the amount of benzene to be vaporized in each stage so that a vaporization is achieved under optimum conditions.

The fresh gas continuously added to the process, by which the hydrogen consumed in the refining is continuously replaced, can thereby be added to the lowest stage of the vaporizing column, preferably after admixture of the hot recycle gas. This is of special significance when, for example, coke-oven gas is used as fresh gas, since coke-oven gas cannot be heated to a temperature above 210°–230° C. because of its content of resin-forming and tarry substances.

The portion of recycle hydrogen-containing gas before introduction into the vaporizing column is heated without danger to, for example, 350° C., even though it is at a comparatively high temperature, since this gas has flowed through the actual purification stages together with the benzene and as a result is free of polymerizable constituents.

An apparatus for carrying out the process of the invention is schematically illustrated in the drawing.

The crude benzene passes from line 2 through compressor 4 into heat exchanger 6 which it leaves at a temperature of about 210° C. The temperature of the heating coils used in heat exchanger 6 is so chosen that no vaporization of benzene takes place. For example, when the pressure in the catalyst converter amounts to about 45 atmospheres, a temperature of the heating coils of about 230°–250° C. or somewhat higher has been indicated as satisfactory. The thus preheated liquid benzene passes through line 8 into the polymerization oven 10 in which the liquid benzene remains a certain time in order to insure the formation of high boiling polymers from impurities in the benzene. The still liquid benzene then passes at a temperature of about 210° C. through line 12 into the vaporizing column 14. The vaporizing column 14 has in the presently illustrated form four stages 15, 16, 17 and 18, each of which has a column of packing material. The liquid benzene is added from line 12 to the top stage through distributing device 19. The liquid benzene comes in contact with the hydrogen-containing gas in the column of packing material, which can also be replaced by other contact means if desired, whereby a partial vaporization of the benzene takes place. The hydrogen gas saturated with benzene vapors is withdrawn from the head of the vaporizing column 14 through line 35 and, after it has passed through heat exchanger 36, goes into the actual catalyst converter 38 in which the actual pressure refining with hydrogen takes place in the presence of a suitable catalyst. The mixture of benzene vapors and hydrogen leaves the catalyst chamber through line 39 and passes, after it has given off a part of its heat in heat exchangers 36 and 6, through line 40 into condenser 41 in which the benzene is liquefied. The liquid product is collected in pressure reservoir 42 and can be withdrawn through line 43. The uncondensed, hydrogen-containing gas leaves the pressure reservoir through line 44 and is flowed in part through line 46 and again into the vaporizer. However, first its pressure is again increased to the full value in intermediate compressor 27, whereafter the recycle hydrogen is heated in heater 28 to a temperature of about 350° C. From the so-heated recycle gas there are branched off from line 30 e. g., three partial streams which are added in regulatable manner through lines 20, 21 and 22 directly to the individual stages of the vaporizing column 14. An additional partial stream of the heated recycle gas is mixed in line 23 with the fresh gas coming from line 34, which fresh or newly-incoming gas has had its pressure increased to the desired value in compressor 32, and is introduced into the lowest stage of the vaporizing column. When the fresh gas newly-incoming into the system through line 31 and coming from line 34 is coke oven gas, the mixture of recycle gas and fresh gas is heated to a temperature which does not exceed about 230° C., prior to being added to the lowest stage of the vaporizing column. In addition, a certain amount of wash oil can be added into the lowest stage through line 13 in order to avoid the deposition of polymerized material on the packing material of the lowest stage in case such a danger exists. The liquid containing the polymer is withdrawn from the vaporizing column through line 26 and is further treated in any way to recover from it the remaining benzene.

The invention claimed is:

1. A process for purifying crude benzene containing impurities, a portion of which are polymerizable to form resinous, higher boiling substances when the crude benzene is heated comprising heating said crude benzene in the liquid phase at an elevated temperature and at superatmospheric pressure in a polymerization zone for a period sufficient to polymerize the polymerizable impurities thereof to resinous compounds of higher boiling point than benzene, vaporizing benzene hydrocarbons while the polymers formed remain in the liquid phase, reacting the vapors obtained with a hydrogen-containing gas at an elevated temperature and a superatmospheric pressure in the presence of a hydrogenation catalyst, cooling the thus-obtained gaseous reaction mixture while under superatmospheric pressure from the catalytic hydrogenating to liquify a purer benzene, said liquid, purer benzene having dissolved therein a hydrogen-containing reaction gas, separating a hydrogen-containing reaction gas from said liquid, purer benzene, and recycling a stream of a portion of the hydrogen-containing reaction gas for admixture with crude benzene, the improvement whereby depolymerization of formed polymers is inhibited during the aforesaid vaporizing of benzene hydrocarbons, which comprises effecting the aforesaid step of vaporizing benzene hydrocarbons by introducing liquid benzene together with the resinous compounds of higher boiling point than benzene from said polymerization zone into an upper portion of a vaporizing column in a region thereof above an uppermost packed vaporizing stage therein, said vaporizing column being divided into a plurality of packed superposed vaporizing stages including an uppermost stage, dividing said stream of the recycle hydrogen-containing reaction gas into a plurality of partial streams, adding at least one of the partial streams in a heated condition to each of said packed vaporizing stages but bypassing a packed vaporizing stage located in a lower portion of said vaporizing column, adding newly incoming hydrogen-containing gas to the bypassed vaporizing stage in the lower portion of said column, whereby liquid benzene hydrocarbons and hydrogen-containing gas pass downwardly and upwardly respectively in countercurrent contact in said vaporizing column, whereby a partial vaporization of the benzene hydrocarbons is effected while formed polymers remain in the liquid phase and a mixture of vapors of benzene hydrocarbons and hydrogen-containing gas is withdrawn from an upper portion of said vaporizing column, and regulating the temperature and the amount of said hydrogen-containing gas added to each of said packed superposed vaporizing stages within said vaporizing column so that the temperature of liquid benzene and liquid polymers in said column does not exceed the temperature which will effect depolymerization of the liquid polymers.

2. A process for purifying crude benzene containing impurities, a portion of which are polymerizable to form resinous, higher boiling substances when the crude benzene is heated comprising heating said crude benzene in the liquid phase at an elevated temperature and at superatmospheric pressure in a polymerization zone for a period sufficient to polymerize the polymerizable impurities thereof to resinous compounds of higher boiling point than benzene, vaporizing benzene hydrocarbons while the polymers formed remain in the liquid phase, reacting the vapors obtained with a hydrogen-containing gas at an elevated temperature and a superatmospheric pressure in the presence of a hydrogenation catalyst, cooling the thus-obtained gaseous reaction mixture while under superatmospheric pressure from the catalytic hydrogenating to liquefy a purer benzene, said liquid, purer benzene having dissolved therein a hydrogen-containing reaction gas, separating a hydrogen-containing reaction gas from said liquid, purer benzene, and recycling a stream of a portion of the hydrogen-containing reaction gas for admixture with crude benzene, the improvement whereby depolymerization of formed polymers is inhibited during the aforesaid vaporizing of benzene hydrocarbons, which comprises effecting the aforesaid step of vaporizing benzene hydrocarbons by introducing the liquid benzene together with the resinous compounds of higher boiling point than benzene from said polymerization zone into an upper portion of a vaporizing column in a region thereof above an uppermost packed vaporizing column therein, said vaporizing column being divided into a plurality of packed, superposed vaporizing stages including an uppermost stage and a lowermost stage, dividing said stream of the recycle hydrogen-containing reaction gas into a plurality of partial streams, adding each of the partial streams, after heating, to each of said packed vaporizing stages, the heated recycle hydrogen-containing gas that is added to said lowermost vaporizing stage being first mixed with a newly incoming hydrogen-containing gas prior to being added to said lowermost stage, whereby liquid benzene hydrocarbons and hydrogen-containing gas pass downwardly and upwardly respectively in countercurrent contact in said vaporizing column, whereby a partial vaporization of the benzene hydrocarbons is effected while formed polymers remain in the liquid phase and a mixture of vapors of benzene hydrocarbons and hydrogen-containing gas is withdrawn from an upper portion of said vaporizing column, and regulating the temperature and the amount of said hydrogen-containing gas added to each of said packed superposed vaporizing stages within said vaporizing column so that the temperature of liquid benzene and liquid polymers in said column does not exceed the temperature which will effect depolymerization of the liquid polymers.

3. A process in accordance with claim 2 further characterized in that newly incoming hydrogen-containing gas is coke oven gas and in that the temperature of the mixture of coke oven gas and heated recycle hydrogen-containing reaction gas that is added to the lowermost packed vaporizing stage in the vaporizing column does not exceed about 230° C.

4. A process in accordance with claim 2 further characterized in that wash oil is added to the lowermost packed vaporizing stage in said vaporizing column to avoid deposition of formed polymers on the packing of this lowermost stage.

References Cited in the file of this patent

UNITED STATES PATENTS

| | | |
|---|---|---|
| 690,681 | Van der Made | Jan. 7, 1902 |
| 1,798,563 | Styrud | Mar. 31, 1931 |
| 2,048,179 | Chandler | July 21, 1936 |
| 2,701,267 | Urban et al. | Feb. 1, 1955 |